United States Patent
Cope et al.

(10) Patent No.: US 7,055,174 B1
(45) Date of Patent: May 30, 2006

(54) METHOD AND SYSTEM FOR WIRETAPPING OF PACKET-BASED COMMUNICATIONS

(75) Inventors: Warren B. Cope, Olathe, KS (US); Ferry J. Gailliaert, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 842 days.

(21) Appl. No.: 09/793,176

(22) Filed: Feb. 26, 2001

(51) Int. Cl.
*G06F 11/00* (2006.01)

(52) U.S. Cl. .......................... 726/22; 379/85; 709/223; 709/224

(58) Field of Classification Search ................... 379/35, 379/85; 709/223, 224; 726/22

See application file for complete search history.

(56) References Cited

U.S. PATENT DOCUMENTS

| | | | | |
|---|---|---|---|---|
| 5,347,572 | A * | 9/1994 | Avni ........................ | 379/93.17 |
| 5,438,570 | A * | 8/1995 | Karras et al. ............... | 370/426 |
| 5,923,744 | A * | 7/1999 | Cheng .................... | 379/221.09 |
| 5,943,393 | A * | 8/1999 | Howell ......................... | 379/35 |
| 6,324,279 | B1 * | 11/2001 | Kalmanek et al. ........... | 379/229 |
| 6,438,695 | B1 * | 8/2002 | Maufer ....................... | 713/201 |
| 6,496,483 | B1 * | 12/2002 | Kung et al. ................. | 370/252 |
| 6,553,025 | B1 * | 4/2003 | Kung et al. ................. | 370/352 |
| 6,600,733 | B1 * | 7/2003 | Deng ......................... | 370/352 |

OTHER PUBLICATIONS

NewNet Product Family, NewNet IP CALEAserver, http://www.newnet.com/products/ipcaleaserver/, printed from the World Wide Web on Jan. 8, 2001.
ADC Adaptive Communications - SMserver, IP CALEAserver, http://www.adc-adapts.com/Products/ipcaleaserver/architecture.cfm, from the World Wide Web on Feb. 21, 2001.
ADC Adaptive Communications - SMserver, IP CALEAserver, http://www.adc-adapts.com/Products/ipcaleaserver/features.cfm, printed from the World Wide Web on Feb. 21, 2001.
ADC Adaptive Communications - SMserver, IP CALEAserver, http://www.adc-adapts.com/Products/ipcaleaserver/overview.cfm, printed from the World Wide Web on Feb. 21, 2001.

* cited by examiner

*Primary Examiner*—Emmanuel L. Moise
*Assistant Examiner*—Michael Pyzocha

(57) ABSTRACT

A method and system for wiretapping a packet-based communication, such as a voice communication for instance. When a node in the normal path of packet-transmission between a source and destination receives packets of the communication, the node can conventionally route the packets to the intended destination. At the same time, a session manager can notify a wiretap server that the session is being established or is underway, and the wiretap server can then direct the node to bi-cast the packets of the communication to the wiretap server node. At the wiretap server, the packetized communication can be depacketized, and a TDM signal representing the communication can be sent via a conventional circuit-switch to a law enforcement agency or other authorized entity.

11 Claims, 4 Drawing Sheets

METHOD AND SYSTEM FOR WIRETAPPING OF PACKET-BASED COMMUNICATIONS

BACKGROUND

1. Field of the Invention

The present invention relates to wiretapping and, more particularly, to a method and system for wiretapping packet based communications, so as to facilitate compliance with governmental mandates for instance.

2. Description of Related Art

Techniques currently exist for wiretapping voice calls. In a traditional circuit-switched telephone network, for example, a wiretap can be readily implemented by identifying a specific telephone line or channel (e.g., TDM time slot, for instance), intercepting the electrical signal carried along that line, and communicating those signals to a surveillance equipment operator. In response to a proper court order, a telecommunications service provider may thereby provide law enforcement officials with real-time access to voice calls.

With the growth of the Internet and other such technology, voice traffic is now often carried from point to point over a packet-switched communication path rather than over a circuit-switched communication path. In this arrangement, a voice signal may be digitized and encoded and the resulting bit stream then divided into a sequence of payload blocks. A header is added to each payload block, thereby establishing a packet. Each packet is then routed independently to a destination address in the packet header. And at the destination address, the packets are then assembled, and the payload is extracted, decoded and converted back into the underlying voice signal.

On Oct. 25, 1994, the United States government enacted the Communications Assistance for Law Enforcement Act (CALEA) to make clear a telecommunications carrier's duty to cooperate in the interception of communications for law enforcement purposes. CALEA requires telecommunications service providers (e.g., telephone companies, etc.) to make available both call content (voice signals) and call data (digits dialed, length of call, etc.) to requesting law enforcement agencies in response to a valid court order. Based on the statute, service providers may soon have to facilitate wiretapping of packet-based voice traffic.

SUMMARY

One way to help comply with CALEA is to insert a wiretap node within the packet communications path. When a packet-based voice call is initiated, a session manager (generally responsible for setting up the call with a remote node in the packet network) can be programmed to set up the call with the wiretap node (i.e., to effectively terminate the call to the wiretap node) rather than to the intended destination, and the wiretap node may, in turn, set up and connect the call to its intended destination while also sending a copy of the packets to a law enforcement agency. Further, a DTMF decoder can be inserted within a packet-gateway in the call path.

Unfortunately, however, such an arrangement can be intrusive, costly, inefficient, and difficult and time consuming to implement. At a minimum, the arrangement is likely to add delay (latency) to packet transmissions, as packets must pass through at least one extra node and call setup mechanism on their way to their destination. Further, the arrangement may necessitate costly hardware and software modifications to entities throughout the network. Still further, since packets in such an arrangement pass through a wiretap server on their way to their destination, the arrangement may undesirably allow a recipient or other entity to learn that the call is being tapped, by conventionally tracing the route of incoming packets. Additionally, the addition of a DTMF decoder to a packet-gateway can be particularly inefficient, leading to increased latency.

An exemplary embodiment of the present invention can help overcome these deficiencies and facilitate efficient compliance with the CALEA mandate. According to the exemplary embodiment, instead of interjecting a wiretapping node into the normal call path (i.e., the path from source to destination), a packet-gateway or other node that is within the normal call path may bi-cast the packets of the voice communication to (i) the intended destination and (ii) a wiretapping server platform. In this way, the packets will pass from source to destination without traversing the wiretapping server, while also sending a copy of the packets to the wiretapping server. Because the packets that reach the destination will not have passed through the wiretapping server, a person at the destination should be unable to determine that the wiretapping server also received a copy of the packets.

In accordance with the exemplary embodiment, the wiretapping server platform may be arranged in a way that takes particular advantage of conventional (and therefore comparatively inexpensive) components, such as a hub and a circuit-switch (of the type conventionally used to connect calls in a circuit-switched network). In particular, the packetized signal that is sent to the wiretapping server platform may be received at an integrated service hub (ISH), which may function to depacketize the signal and output a representative TDM signal (i.e., a channel of a TDM signal). The TDM signal may then be provided to a circuit-switch, which may in turn couple the TDM signal to an observer (or, equivalently, an observer station), such as a person or machine at or associated with a law enforcement agency for instance. There, the signal can be played and recorded or otherwise handled.

In addition, the use of a circuit-switch can conveniently facilitate capturing of DTMF digits that are dialed within the voice communication, so as to report those digits to a law enforcement agency as well. DTMF-decoding (e.g., analyzing a bit stream to detect and identify DTMF digits represented by the bit stream) is a conventional feature of most circuit-switches. Leveraging this functionality, the circuit switch employed as part of the wiretapping platform in an exemplary embodiment can be made to detect and report DTMF digits to a law enforcement agency or to another designated entity that may then make the digit data available to the law enforcement agency.

Thus, in one respect, an exemplary embodiment of the invention may take the form of a method of wiretapping a voice communication that is represented by a number of packets being communicated in a packet-switched network between a source address (e.g., a first gateway) and a destination address (e.g., a second gateway). In normal transmission, the packets of the communication may traverse (i.e., emanate from, arrive at, and/or pass through) a node in the packet-switched network regardless of whether a participant in the voice communication is under surveillance.

The exemplary method may involve making a determination that a participant in the voice communication is under surveillance and, in response to that determination, causing the node to also transmit the packets to a wiretap server (e.g., to an ISH or other such entity that functions as part of a wiretap server). As a result, the node may thus bi-cast the packets to both (i) their intended destination and (ii) the wiretap server, such that the packets still pass to their intended destination without passing through the wiretap server (while a separate copy of the packets pass to the wiretap server).

In turn, the wiretap server may output a signal (e.g., a packet sequence, a bit stream, an analog waveform or other form) representative of the voice communication for receipt by an observer (i.e., any authorized entity, such as a person and/or a machine, whether the final point of observation or an intermediate point such as a storage center, for instance). More particularly, the wiretap server may convert the packets into a digital bit stream representing the voice communication and send the bit stream (either internally within the wiretap server or externally) to a circuit-switch. The wiretap server (e.g., a controller within the server) may then cause the circuit-switch to output the representative signal (i.e., equivalently, the voice communication) for receipt by the observer.

Further, the circuit-switch may decode at least one DTMF digit from within the voice communication and output a signal representative of the at least one DTMF digit. A signal representative of the at least one DTMF digit may then be output (e.g., by the wiretap server) for receipt by the observer.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Architecture

Figure 1:
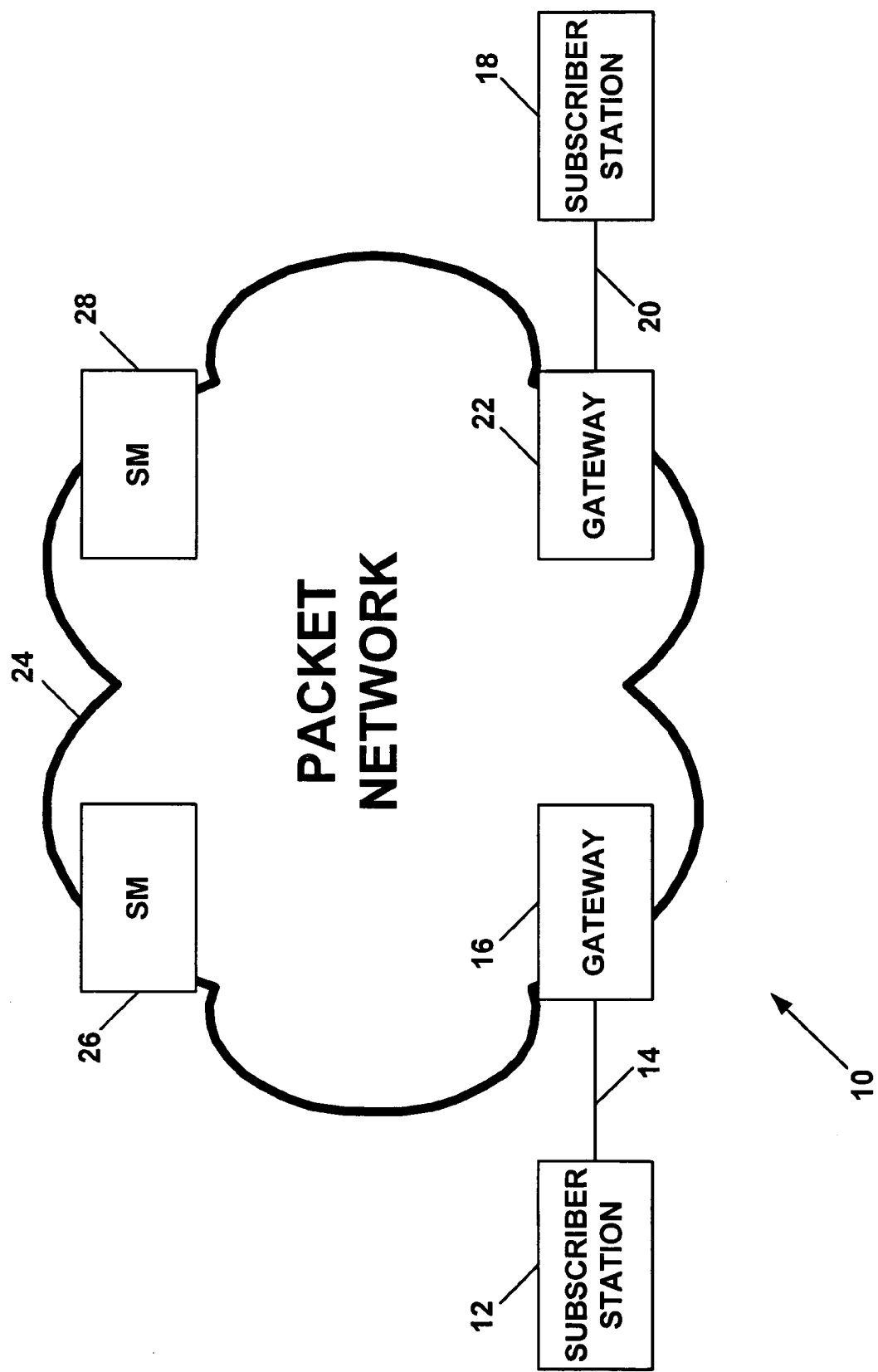
FIG. 1 is a block diagram of a communications network in which the exemplary embodiment can be employed.

Referring to the drawings, FIG. 1 illustrates a typical system 10 for communicating voice and other media via a packet-switched network. System 10 includes a first subscriber station 12 coupled by a first communications link 14 to a first gateway 16, and a second subscriber station 18 coupled by a second communications link 20 to a second gateway 22. Gateways 16, 22 may each sit as nodes on a packet-switched network 24 such as an IP network or an ATM network for instance. Additionally sitting on network 24 may be a first session manager 26 arranged to set up communication sessions for gateway 16 and a second session manager 28 arranged to set up communication sessions for gateway 22.

It should be understood that the arrangements shown in FIG. 1 and the other figures are provided for purposes of illustration only. The entities illustrated may be functional entities that may be distributed, combined together, altered or even omitted. For instance, although packet-switched network 24 is shown as a single cloud in FIG. 1, the network may itself comprise a number of sub-networks, with session managers 26, 28 (and perhaps gateways 16, 22) sitting on a private service provider sub-network and communications flowing between gateways over a public network such as the Internet. Other examples are possible as well.

Still further, it should be understood that, where an entity is described as performing a particular function, the entity may perform that function through execution of a suitable set of software, firmware and/or hardware logic. Provided with the present disclosure, those of ordinary skill in the art should be able to readily prepare and employ suitable logic to carry out the functions indicated.

In the arrangement shown in FIG. 1, first and second subscriber stations 12, 18 may each take various forms. By way of example, either or each of the subscriber stations may be a landline or wireless telephone, computer or other device. As such, each subscriber station may be arranged to send and receive voice signals. Conventionally, for instance, each subscriber station may have a microphone for receiving and converting acoustic waves into electrical (or, equivalently, optical) signals, a speaker for receiving and converting electrical signals into acoustic waves, and a suitable transceiver (e.g., transmitter and receiver) for sending and receiving the respective electrical signals representing the voice signals.

Communication links 14, 20 may also take various forms. In a typical arrangement, for instance, a subscriber station may be coupled via copper wires, optical fibers, coaxial cable, or any other suitable transmission medium to a telephone company central office, which may in turn include or be coupled by a high bandwidth line (such as a T1 line, for instance) to the gateway. Thus, the central office may communicate via analog or digital signals with a subscriber station on one hand, and the central office may communicate via a digital bit stream carried as a TDM channel in a DS1 or other such signal with the gateway on the other hand. Either or each communications link shown in FIG. 1 may take this or any other form.

The gateways 16, 22 may similarly take various forms. Generally speaking, a gateway may function as a point of entry (ingress) to and exit (egress) from the packet-switched network. As such, a gateway may function to convert between circuit-switched communications (e.g., TDM) with a communications link on one hand and packet-based communications (e.g., IP packets or ATM cells (hereafter referred to as "packets")) with the packet-switched network on the other hand. Further, a gateway may conventionally include source coding and/or channel coding functionality, so as to compress media signals for transmission over the packet-switched network and/or to add redundancy information to signals so as to help facilitate recovery from errors (e.g. packet loss) in transmission over the packet-switched network.

Figure 2:
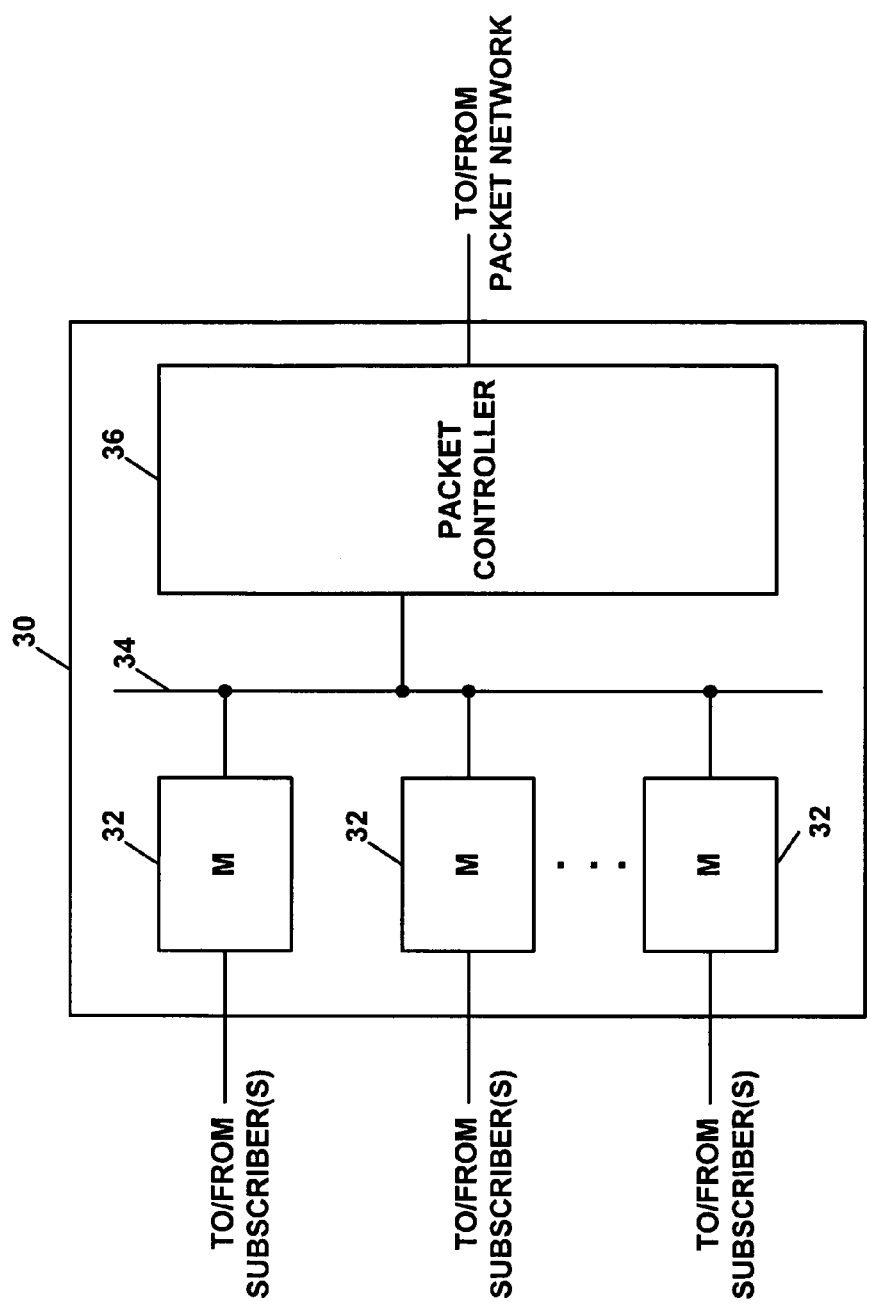
FIG. 2 is a block diagram of a node suitable for bi-casting packet-based communications in accordance with the exemplary embodiment.

FIG. 2 depicts an exemplary gateway 30, which may be representative of either or both of gateway 16, 22. As shown, gateway 30 may comprise a number of high density modems 32 providing T1 or other suitable connectivity to subscribers via circuit-switched links. Modems 32 may be coupled to a system bus 34. In turn, coupled to system bus 34 may be a packet-controller 36.

For voice communications entering the packet-switched network, modems 32 may function to receive and encode subscriber signals so as to produce encoded subscriber signals. Packet-controller 36, in turn, may function to packetize the encoded subscriber signals so as to produce representative packets suitable for transmission over a packet-switched network. The packet-controller may then transmit the packets onto the network for receipt by another designated entity.

Similarly, for voice communications exiting the network, the packet-controller may function to depacketize and reassemble packets representing a voice communication so as to recover the underlying encoded subscriber signal. In turn, modems 32 may function to decode the subscriber signals and to output the signals for transmission to a designated recipient.

Gateway 30, and particularly packet-controller 36, may define a number of ports (linkpoints) associated with preset routing paths (e.g., PVCs or MPLS label-switched paths, for instance) that provide connectivity with various designated entities in the network. In order to facilitate routing to a particular destination, gateway 30 may receive an instruction signal directing it to route via a particular port associated with that destination, and gateway 30 may responsively route the packets via that port. Alternatively, gateway 30 may include an internal table that correlates ports with destinations. Still alternatively, gateway 30 may route packets independently into the network (rather than via a preset routing path) to the destination.

Referring back to FIG. 1, session managers 26, 28 may function to set up communication sessions for gateways 16, 22 (and for other such nodes), and may maintain a state machine indicating when sessions are in progress and with whom. In this regard, for instance, when gateway 16 receives a request to initiate a communication from subscriber station 12 to remote subscriber station 18, gateway 16 may pause processing and send a signaling message to session manager 26, via network 24. The signaling message may identify various parameters associated with the proposed communication, such as the address (e.g., directory number) of the originating party (e.g., subscriber station 12) and the address of the terminating party (e.g., subscriber station 18).

Upon receipt of the signaling message, session manager 26 may then engage in signaling communication with remote session manager 28, seeking to set up the communication. Remote session manager 28 may, in turn, signal to gateway 22 to determine whether gateway 22 has the ports available to be able to receive the communication and pass the communication to subscriber station 18. Assuming that a transmission path is available, session manager 26 may signal back to gateway 16, directing gateway 16 to route the packets of the communication via a particular port associated with remote gateway 22, or to otherwise transmit the packets to remote gateway 22. In response, gateway 16 may then route the packets to gateway 22, which (after possibly signaling to session manager 28 to facilitate any necessary terminating call treatment) may then transmit the underlying communication signal to subscriber station 18.

Figure 3:
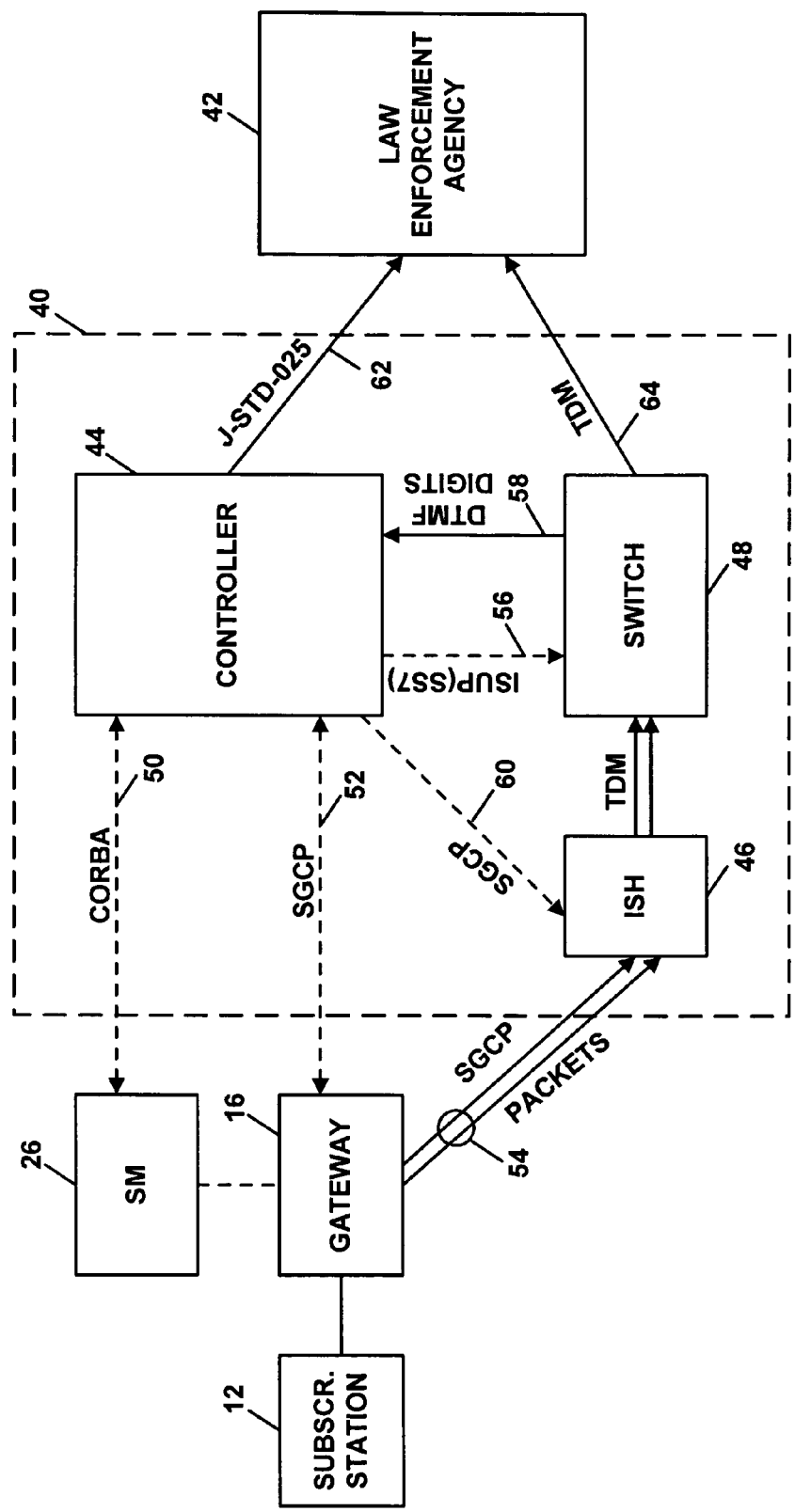
FIG. 3 is a block diagram of a system arranged in accordance with the exemplary embodiment.

Referring now to FIG. 3, there is shown an arrangement for facilitating wiretapping in accordance with the exemplary embodiment. As shown in FIG. 3, a wiretap server node (WTSN) 40 is provided, to help facilitate tapping into packet-based voice traffic and providing the underlying voice signals and DTMF digits to one or more authorized entities such as a law enforcement agency 42 for instance. WTSN 40 is shown to include a controller (also referred to as a wiretap server) 44, an integrated service hub (ISH) 46, and a circuit-switch 48. These functional entities may be co-located, preferably at a secure physical site.

Controller 44 and ISH 46 may each be coupled with (i.e., sit as a nodes on) packet-switched network 24, so as to facilitate communication with entities on the network. For purposes of example, FIG. 3 shows (i) a packet-switched link 50 between controller 44 and session manager 26, (ii) a packet-switched link 52 (preferably firewall protected) between controller 44 and gateway 16, and (iii) a packet-switched link 54 between ISH 46 and gateway 16. It should be understood that controller 44 and ISH 46 may be able to communicate similarly with other analogous entities throughout network 24 (such as session manager 28 and gateway 22, for instance), so as to broadly support wiretapping in the manner presently contemplated.

Controller 44 may further be coupled with switch 48, via both a signaling link 56 and a switching trunk 58, and controller 44 may be coupled via a packet-switched link 60 (preferably firewall protected) with ISH 46. In addition, controller 44 may be coupled by a transmission line 62 or other communications link to law enforcement agency 42 or other observer, and switch 48 may also be coupled by a transmission line 64 to the law enforcement agency. Note that the controller and switch may be coupled to multiple law enforcement agencies and/or other observer stations, so as to facilitate providing wiretapped signals to multiple entities at once or otherwise if desired.

Each of the entities in WTSN 40 may take a variety of forms. By way of example, controller 44 may be a server-class computer, such as a Sun Microsystems Ultra 5 for instance. As such, the controller may have a processor, a data storage medium, and one or more communications interfaces for facilitating communication over the links mentioned above. The data storage medium may store a number of machine language instructions executable by the processor to carry out the functions described herein. Further, in the exemplary embodiment, controller 44 may be programmed with a state machine to keep track of sessions that are being initiated or are underway, similar to the functions that may be performed by a session manager.

Switch 48, in turn, may be a conventional circuit-switch, of the type used in circuit-switched networks to connect calls from one point to another. As such, switch 48 may include a switching matrix and programmed processor, for selectively providing connectivity between a plurality of ports/trunks linked to predetermined external points. Switch 48 may thus also include a data storage medium that contains a number of machine language instructions executable by the processor to carry out the functions described. For instance, switch 48 may be programmed with messaging functionality, such as SS7/ISUP (Signaling System 7/ISDN User Part), to facilitate setting up of calls. Further, switch 48 may be programmed to detect DTMF digits dialed within a voice-band signal, and to provide indications of those digits to controller 44. An example of a suitable switch is a Cisco VCO/4k switch.

ISH 46 may also take various forms. By way of example, ISH 46 may be a TelGen B100 integrated service hub, for instance. Similar to gateway 30 described above, ISH 46 may function to convert between packet-based communications on one hand and circuit-switched communications on the other hand. ISH 46 may have one or more input ports providing connectivity with packet-switched network 24, so as to facilitate communication with entities such as gateway 16 for instance. Further, ISH 46 may have one or more output ports providing connectivity with one or more trunks linked to switch 48, so as to facilitate communication with switch 48. Thus, ISH 46 may receive a packet-based communication on an input port and may depacketize and translate the communication into a bit stream and transmit the bit stream in a TDM time slot via an output port and trunk to switch 48.

Further, in accordance with the exemplary embodiment, gateway 16 (and/or other such nodes that may sit within the normal packet transmission path for a given communication) may be programmed with logic to be able to receive multiple routing instructions for a given set of packets, so as to be able to "bi-cast" the packets. Through application of this logic, gateway 16 may be able to receive and respond to one or more instructions that cause it to route the packets of a communication via multiple ports at once, or otherwise to transmit the packets of the communication to multiple destinations at once. For instance, one instruction may direct the gateway to route the packets of a communication via port A, and another instruction may direct the gateway to route the packets of the communication via port B. Following these instructions, gateway 16 may effectively multi-cast the packets (functionally copying the packets and outputting them) via both port A and port B, so that the packets go to two places at once.

2. Exemplary Operation

In accordance with the exemplary embodiment, wiretapping of a packetized voice communication can be accomplished by having a node in the normal path of the communication bi-cast the packets of the communication to (i) their intended destination and (ii) a wiretap server such as that described above. The wiretap server may then depacketize the communication and output it for receipt by an observer such as a law enforcement agency. At the same time, the packets of the communication may reach their destination without passing through the wiretap server, thereby helping to prevent a recipient from learning that the communication is being tapped.

Figure 4:
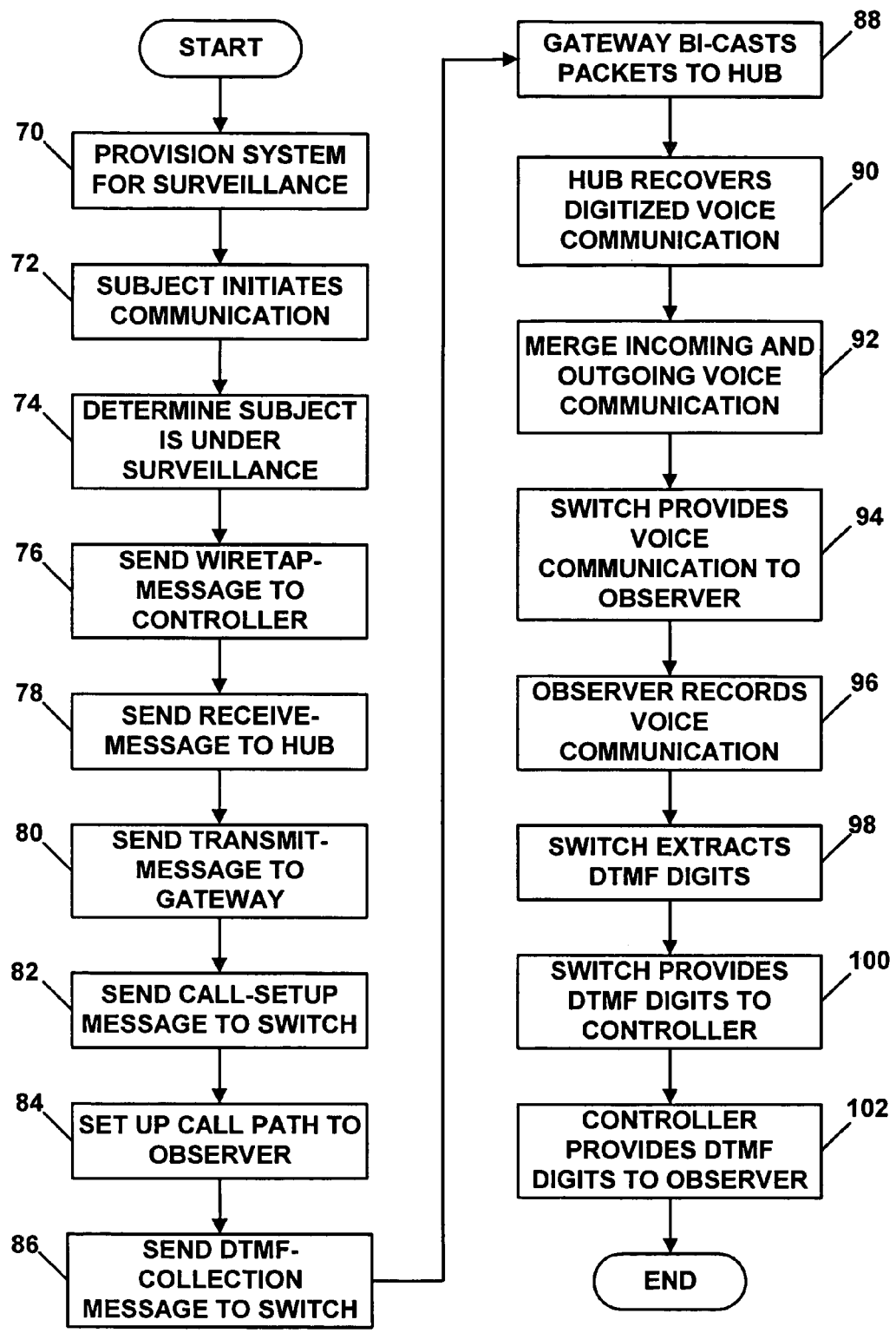
FIG. 4 is a flow chart depicting functions that may be performed in accordance with the exemplary embodiment.

FIG. 4 is a flow chart depicting this exemplary operation in greater detail. As with the block diagrams described above, it should be understood that the elements shown in FIG. 4 are intended only as examples. Various functions shown may be modified, combined or omitted, the order of functions may vary, and other functions may be added as well.

Referring to FIG. 4, a telecommunications service provider may first receive a valid court order to deliver call content involving a particular subject (e.g., a particular network address such as a directory number, IP address, subscriber station, person, or other participant in a communication session), such as subscriber station 12, for instance. In response, at block 70, the service provider may provision a network entity (or entities) with instructions, such as an identification of the subject, start/stop dates for surveillance, and an indication of whether DTMF digits are to be delivered to the law enforcement agency.

In the exemplary embodiment, one such entity may be WTSN 40, and particularly controller 44. Further, another such entity may be an entity that will participate in setting up or otherwise facilitating communications involving that subject. Examples of such entities include a gateway, a session manager, or a service agent or other platform that may be put on notice when a communication is being established to or from the subject.

With reference to FIGS. 1 and 3, for instance, the service provider may provision controller 44 and session manager 26 with surveillance instructions concerning surveillance of subscriber station 12. To do so, the service provider may enter a record of surveillance instructions into controller 44. In response, controller 44 may store that record for later reference and may additionally send a message (e.g., via CORBA) to session manager 26, providing the record of surveillance instructions. (Controller 44 may identify session manager 26 as the entity that will handle communications to or from subscriber station 12.) Session manager 26 may then store the surveillance instructions in a subscriber record or in any other form for later reference.

At block 72, a caller may then initiate a voice communication session to or from the subject under surveillance (i.e., the subject whose communication is or will be tapped). By way of example, the caller may be a person operating subscriber station 12, seeking to place a call to remote subscriber station 18. In that case, the caller would be initiating a voice communication session from the subject under surveillance, namely subscriber station 12.

Proceeding as normal, gateway 16 may thus receive an origination request and responsively signal to session manager 26 for handling instructions. After negotiating with remote session manager 28, session manager 26 may then instruct gateway 16 to route the packets of the voice communication via a particular port associated with remote gateway 22, and gateway 16 may route the packets to their intended destination (e.g., remote gateway 22) as instructed. Through this conventional call setup and connection process, packets representing a communication from station 12 to station 18 may pass from gateway 16 to gateway 22, and packets representing communication from station 18 to station 12 would pass from gateway 22 to gateway 16, thereby facilitating two-way end-to-end communication between stations 12 and 18.

According to the exemplary embodiment, at block 74, an entity that is involved with initiating or maintaining the communication session (or any other entity for that matter) may also programmatically determine that the subject is under surveillance. In the present example, that entity may be session manager 26. Having been provisioned with a record indicating that subscriber station 12 is under surveillance, session manager 26 may refer to the record (e.g., by a query keyed to the address of station 12, for instance), confirm that the current date falls within the authorized dates of surveillance, and thereby determine that subscriber station 12 is under surveillance.

In response, at block 76, session manager 26 may programmatically send a wiretap-message to controller 44, advising the controller that a session involving the subject is being established and providing the controller with an indication of two ports (linkpoints) in gateway 16 that are associated with ISH 46 (i.e., ports by which gateway 16 can route packets to ISH 46). More particularly, the session manager may provide controller 44 with two Network Access Points, each defining the network address of gateway 16 and a respective port at that network address, each port being associated with a respective port at ISH 46. Advantageously, this could be the extent of involvement by session manager 26, thus helping to keep the wiretapping process from interfering with normal call processing.

At block 78, controller 44 may then responsively send a receive-message (e.g., an SGCP message) to ISH 46, instructing the ISH to set aside the two ports so as to be able to receive packet sequences representing voice being transmitted respectively to and from the subject under surveillance. Further, at block 80, controller 44 (acting like a session manager) may send a transmit-message (e.g., an SGCP message) to gateway 16 (at the address provided by the session manager), instructing the gateway to bi-cast (i.e., to also transmit) the incoming packets of the communication session via the ports associated with the reserved ISH ports.

Still further, at block 82, controller 44 may responsively send a call-setup message to circuit-switch 48, instructing the switch to set up a call path between ISH 46 and law enforcement agency 42 (or simply to set up a call path from the switch to the law enforcement agency). In the exemplary embodiment, the call-setup message can be a conventional ISUP message, such as an initial address message ("IAM") for instance. In response, at block 84, switch 48 may set up the call path as directed.

Further, at block 86, if DTMF digits are to be delivered, controller 44 may also send a signaling message to switch 48, directing the switch to detect DTMF digits in the content of the call being set up and to provide controller 44 with a digital representation of those DTMF digits. Switch 48 may responsively set a flag indicating that it should do so. Alternatively, a switch such as the Cisco VCO/4k can be programmed to automatically extract DTMF digits from call content and to send a representation of those digits to a designated IP address. Thus, switch 48 could be set to send DTMF digit data via link 58 to an IP address of controller 44, without a request from the controller.

As the gateway receives packets of the voice communication, at block 88, the gateway may then programmatically send copies of the packets to the designated ports of the ISH, via a packet channel (such as the AAL2 ATM channel, or via TCP/IP, for instance), as instructed by controller 44. At block 90, ISH 46 may then programmatically assemble the packet sequences and depacketize (and possibly decode) the underlying digitized voice signals representing communications to and from subscriber station 12.

In turn, at block 92, the ISH may then programmatically merge the digitized voice signals and send the resulting conversation in a TDM signal to switch 48. Alternatively, the ISH may send the two digitized voice signals (one representing incoming communication and one representing outgoing communication) to the switch, and the switch may merge the signals into a single signal (through use of a conventional conference bridge for instance). Advantageously, by handling the incoming and outgoing communications separately, the exemplary embodiment facilitates selective tapping of one side or both sides of the communication, as desired. (E.g., controller 44 could instruct gateway 16 to bi-cast either one or both sides of the communication to ISH 46.)

Upon receipt (or establishment through merging) of the TDM signal at switch 48, at block 94, switch 48 may provide the TDM signal to the law enforcement agency. At block 96, the law enforcement agency may then record the conversation.

Further, also upon receipt of the TDM signal(s), at block 98, switch 48 may extract DTMF digits (if any) from the signals, autonomously or in response to a request from controller 44 or another entity. At block 100, switch 48 may then provide the DTMF digits to controller 44, such as by sending the digits via link 58 to an IP address of controller 44. In turn, at block 102, controller 44 may programmatically convert those digits into a CALEA-compliant message (e.g., pursuant to industry standard J-STD-025, published by the Telecommunications Industry Association and incorporated herein by reference) and send the message directly or indirectly (e.g., through a surveillance interface node) to law enforcement agency 42.

Additionally, in the event the service provider has been ordered to deliver call data information (such as the date/time of the call, the length of the call, etc.), the session manager may programmatically send one or more messages (e.g., CORBA messages over IP) to controller 44. Controller 44 may then convert the information in those messages into CALEA-compliant messages and send the resulting messages directly or indirectly to law enforcement agency 42 as well.

3. Exemplary Alternatives

An exemplary embodiment of the present invention has been described above. Those skilled in the art will understand, however, that changes and modifications may be made to this embodiment without departing from the true scope and spirit of the present invention, which is defined by the claims.

By way of example, although the above description has focused on wiretapping a packet-based voice communication, the system described can equally extend to wiretapping any packetized media. The media may be any sort of voice-band signal, such as voice, audio, or modulated data (e.g., facsimile transmissions, modem calls, etc.), such as signals that can be readily handled by circuit-switch 48. Alternatively, the media may take still other forms, such as video, for instance. (In that case, switch 48 might be replaced or supplemented with a video switching mechanism if appropriate.)

As another example, while the foregoing description has focused on wiretapping pursuant to a valid court order, and sending the intercepted call content to a law enforcement agency, the system can equally extend to wiretapping in any other instance and providing the intercepted call content to one or more other entities. For instance, often when a caller interacts with a call center, the call center puts the caller on notice that the call may be recorded. In that instance, the call center may programmatically provision WTSN 40 to wiretap the call content and to provide the content to the call center or other entity for recording.

As yet another example, although the subscriber stations described above are described as circuit-switched terminals (such as standard telephones, for instance), and the gateways are described as converting between a subscriber signal on one hand and packets on the other hand, the subscriber stations and gateways could take other forms. For instance, the subscriber stations themselves could be packet-terminals (such as Ethernet-telephones, for example). In that case, a subscriber station could replace the gateway in the wiretapping functions described above. Further, the gateways could equally be packet-to-packet nodes, rather than circuit-to-packet nodes.

Additionally, the node that performs the bi-casting function described above could be any node within the normal call path (i.e., any node that packets of the communication traverse (originate from, terminate to, and/or pass through) on their way from source to destination regardless of whether a participant of the communication is under surveillance. Other than a gateway at the ingress or egress of the packet-switched network, for instance, exemplary nodes may include routers, switches and hubs throughout the network.

The invention claimed is:

1. A method of wiretapping a communication represented by a number of packets being communicated in a packet-switched network between a source address and a destination address, via at least one node, the method comprising, in combination:

during initiation of the communication, an entity involved with the initiation making a determination to place a participant in the communication under surveillance;

in response to the determination, the entity sending a wiretap-message to a controller, the wiretap-message indicating a network access point of the node;

in response to the wiretap-message, the controller sending a receive-message to a hub and sending a transmit-message to the node, the receive-message instructing the hub to reserve at least one port at which to receive the packets of the communication, and the transmit-message instructing the node to transmit the packets to the at least one port of the hub, wherein, the node then bi-casts the packets to (i) the at least one port of the hub and (ii) the destination address;

the hub receiving the packets and responsively converting the packets into a digital bit stream representative of the communication;

the controller sending a call-setup message to a circuit-switch, the call-setup message instructing the circuit-switch to establish a circuit-switched call path between the hub and an observer via the circuit-switch, wherein the circuit-switch responsively establishes the circuit-switched call path; and the hub sending the digital bit stream via the circuit-switched call path to the circuit-switch, and the circuit-switch responsively forwarding the communication via the circuit-switched call path to the observer.

2. The method of claim 1, wherein the entity involved with initiation of the communication comprises a session manager.

3. The method of claim 1, wherein the observer comprises an authorized entity.

4. The method of claim 3, wherein the observer comprises a law enforcement agency.

5. The method of claim 3, wherein the observer comprises a call center authorized to record the communication.

6. The method of claim 1, wherein the transmit-message further indicates the at least one port of the hub, the node thereby learning from the transmit-message where to send the packets.

7. The method of claim 1, further comprising the circuit-switch (i) decoding at least one DTMF digit from within the communication and (ii) sending to the controller at least one signal indicative of the at least one DTMF digit, whereby the controller may output information indicative of the at least one DTMF digit, for receipt of the information by the observer.

8. The method of claim 1, wherein the communication comprises a voice communication.

9. The method of claim 1, wherein the communication comprises a facsimile communication.

10. A system for wiretapping a communication represented by a number of packets being transmitted in a packet-switched network between a source address and a destination address, via at least a first network node, the system comprising, in combination:

an entity involved with initiation of the communication;

a wiretap-controller communicatively linked with the first network node;

a second network node arranged to receive a packet sequence representative of an underlying signal and to responsively convert the packet sequence into a bit stream representative of the underlying signal;

a circuit-switch communicatively linked with the wiretap-controller and with the second network node;

wherein, during initiation of the communication, the entity involved with the initiation makes a determination to place a participant in the communication under surveillance, and in response to the determination, sends a wiretap-message to the wiretap-controller, the wiretap-message indicating a network access point of the first network node;

wherein, in response to receiving the wiretap-message, the wiretap-controller sends a first signaling message to the first network node, and the first network node responds to the first signaling message by transmitting the packets to the second network node, the first network node also transmitting the packets to the destination address;

wherein, also in response to receiving the wiretap-message, the wiretap-controller sends a second signaling message to the circuit-switch, and the circuit-switch responds to the second signaling message by setting up a circuit-switched call path between the second network node and an observer station;

wherein the second network node receives the packets, converts the packets into a bit stream representing the communication, and sends the bit stream via the circuit-switched call path to the circuit-switch; and wherein the circuit-switch receives the bit stream and responsively sends the communication to the observer station via the circuit-switched call path.

11. The system of claim 10, wherein the circuit-switch decodes at least one DTMF digit from within the communication and outputs a signal indicative of the at least one DTMF digit, whereby the signal may be communicated to the observer station.

* * * * *